Nov. 7, 1961     O. HÄFNER     3,007,176
ARTIFICIAL LIMBS FOR AMPUTEES Filed March 11, 1957     9 Sheets-Sheet 1

Fig. 1

Inventor:
OTTO HÄFNER
BY:
Michael S. Striker

Nov. 7, 1961     O. HÄFNER     3,007,176
ARTIFICIAL LIMBS FOR AMPUTEES
Filed March 11, 1957     9 Sheets-Sheet 2

Inventor:
OTTO HÄFNER
BY:

Nov. 7, 1961 O. HÄFNER 3,007,176
ARTIFICIAL LIMBS FOR AMPUTEES
Filed March 11, 1957 9 Sheets—Sheet 5

Inventor:
OTTO HÄFNER
BY
Michael S. Struker
Cpt

Nov. 7, 1961  O. HÄFNER  3,007,176
ARTIFICIAL LIMBS FOR AMPUTEES
Filed March 11, 1957  9 Sheets-Sheet 9

Inventor:
Otto Häfner
By:
Michael S. Striker

United States Patent Office 3,007,176
Patented Nov. 7, 1961

3,007,176
ARTIFICIAL LIMBS FOR AMPUTEES
Otto Häfner, Orthopädische Klinik, Heidelberg-Schlierbach, Germany
Filed Mar. 11, 1957, Ser. No. 645,137
14 Claims. (Cl. 3—1.2)

The present invention relates to artificial limbs for amputees.

In preferred types of artificial limbs, the movements are derived from the motions of the stump. If the stump is rather short, the artificial limb is often mounted for indirect actuation, that is, it must be moved by another part of the amputee's body. In more recent apparatus and when only a short stump is available, the joints are articulated by servomotors employing compressed air. The motors are controlled by a valve system whose elements in turn are guided by the stump muscles or certain other muscles in the user's body. Such arrangement avoids the now customary introduction of channels in the stump muscles which often cause inflammation of tissue or other inconveniences. The servomotors are capable of generating forces which are substantially greater than the force of the stump muscles, which is another essential advantage of such artificial limbs. A still further advantage of servomotor-actuated limbs is in that not only the stump muscles but many other muscle groups of the amputee's body can control the operation of the motors, which permits more precise guidance of the limb even if only a short stump or no stump at all is available. In the known apparatus of such nature, the control of pneumatically operated motors is performed by so-called "squeeze valves" which are connected in such manner that the exhaust valve automatically closes when the inlet valve is open or vice versa. Thus, only full movements or partial movements with immediate return of the limb into original position are possible. Controlled partial movement of the entire limb or motions of limb parts in such manner that the entire limb or one of its articulate elements may be arrested in any desired position after partial motion are not possible. An additional disadvantage of the known artificial limbs operating with compressed air is in that they lack certain extremely important characteristics of a natural limb, namely, the sensitivity for the range and strength of the actuating medium.

The principal object of the present invention is to provide an artificial limb which may be controlled by its user in an extremely simple and reliable manner to perform full or partial movements closely approaching the natural motion of a sound limb.

Another object of the invention is to provide an artificial limb provided with such actuating mechanism which enables the user to determine and control the forces with which the mechanism moves or maintains the limb in a certain position.

A further object of the invention is to provide a system of inlet and exhaust valves for pneumatically articulated artificial limbs which may be controlled by the amputee in such manner that his muscles act as resilient elements of an adjustable reducing valve to signal to the user the momentary pressure in the servomotors.

A still further object of the present invention is to provide an artificial limb actuated by pneumatic servomotors each under the control of an inlet valve and an exhaust valve, wherein at least one of said valves acts as a reducing valve in combination with a tripping device which is moved by a muscle or a muscle group of the user.

An additional object of the invention is to provide an artificial limb of the above character whose servomotors are each operated by an inlet and an exhaust valve which are mounted in such manner that the inlet valve may be opened while the exhaust valve remains closed, or vice versa, whereby the limb may perform partial movements and be arrested in any desired position.

A more specific object of the invention is to provide an artificial limb of the character set forth in which the pneumatic motors are under the control of an inlet valve and a reducing exhaust valve, and the valves are mechanically connected together in such manner that the opening of exhaust valve depends on the extent of pressure in the inlet valve.

Another specific object of the invention is to provide an artificial limb whose movements are generated by pneumatic servomotors each under the control of an inlet valve, an exhaust valve, and a closing valve mounted between the servomotor and the exhaust valve in such manner that the muscle-controlled tripping device opens the closing valve before the inlet valve is opened, and closes same only when the inlet and exhaust valves are unaffected by the tripping means.

Another important object of the invention is to provide in an artificial limb arresting means actuated by pneumatic servomotors under the control of independently operating inlet and exhaust valves for maintaining the articulately joined parts of the limb in any desired position by a certain muscle or muscle group in the amputee's stump or thorax.

A yet further object of the invention is to provide in combination with an artificial limb of the above character a plurality of inlet and exhaust valves for control of individual servomotors which impart motion to the articulately joined parts of the limb, and a common valve actuating element operable by a single muscle or muscle group in such manner that the extent of muscular movement determines which valve or group of valves is actuated.

A yet further object of the invention is to provide a valve system for one or two artificial limbs which is divisable into two or more groups to be actuated by separate muscles in the amputee's body, whereby to simplify the control and prevent excessive strain to the user when one or two multi-joint limbs are necessary, especially if each part of the limb performs one or more separately controllable motions.

A yet further object of the present invention is to provide an artificial arm actuatable by pneumatic servomotors each of which is controlled by independently operating inlet and exhaust valves in such manner that a single muscle group may originate a series of motions in a predetermined sequence.

A still further object of the present invention is to provide an artificial arm of the above character whose servomotors are controlled by one or more groups of valves with each group of valves associated with a separate muscle or muscle group, combined with indicator means to signal the amputee which valve or group of valves already was actuated and to thus prevent an undesired or inadvertent movement of the artificial limb.

An additional object of the invention is to provide in the artificial limb of the character set forth means for reducing the noise generated by the compressed fluid as it escapes through one or more exhaust valves when the parts of the limb execute a certain motion.

A still further important object of the present invention is to provide a single valve system for alternate control of two artificial limbs combined with a switchover device which is operated by another muscle or muscle group in such manner that the user can switch the controls from one artificial limb to the other when he so desires.

The novel features which are considered as characteristic for the invention are set forth in particular in the appended claims. The invention itself, however, both as to its construction and its method of operation, together with additional objects and advantages thereof, will be best understood from the following description of specific embodiments in which:

Figure 1:
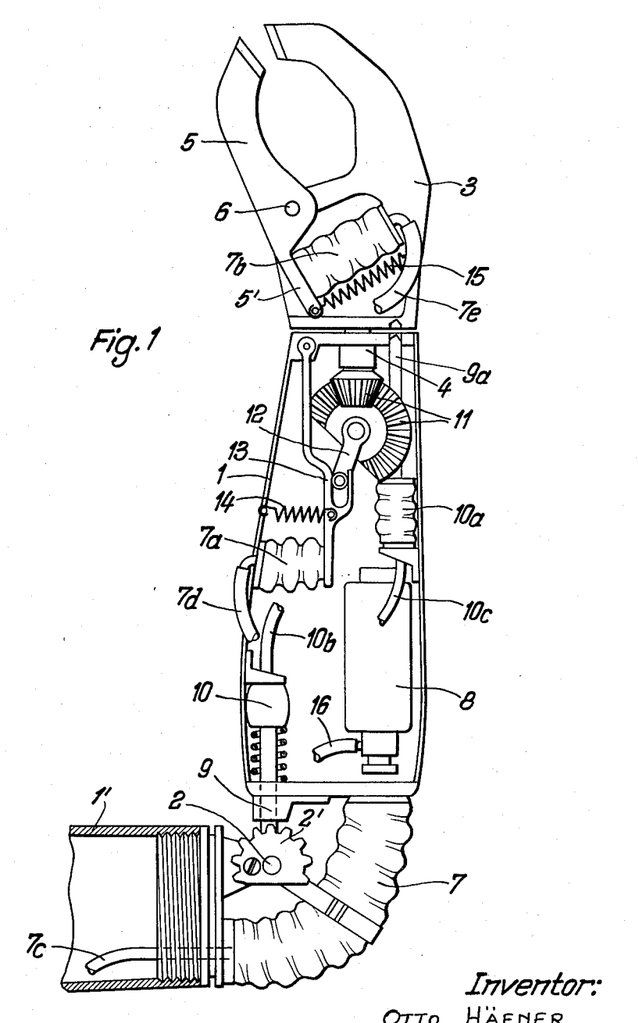
FIG. 1 is a longitudinal section through an artificial arm having a movable elbow joint, rotatable hand and a flexible thumb, which is connectable with a brachial stump wherein certain parts of the schematically represented articulation systems are broken away for better illustration.

According to FIG. 1, the multi-joint artificial limb consists of an upper arm portion in the form of a socket 1' receiving the stump (not shown), a forearm 1, rigid hand 3 and an articulately mounted thumb 5. The socket-like upper arm 1' is joined with the forearm by an elbow pin 2 carrying a segmental wheel 2' which latter is also rigidly connected with the upper arm socket. The hand 3 and thumb 5 may rotate with respect to the forearm 1 about a shaft 4. The phalanges and the metacarpal portion are rigid, but the thumb 5 may pivot on a pin 6 with the spring 15 between the metacarpus and an extension 5' of the thumb acting as an extensor for the latter. Servomotors 7, 7a and 7b communicate flexing motion to elbow joint 2, rotary motion to wrist shaft 4, and flexing motion to thumb 5, respectively. The motors 7, 7a, and 7b each consist of a plaited bellows for reception of a compressed fluid, preferably air, and are fed from a common tank 8. Arresters 9, 9a are provided to maintain the respective joints 2 and 4 in a fixed position, when desired. These arresters are actuated by servomotors 10 and 10a, respectively. The mode of actuation of the motors either by the muscles of the stump or by the muscles in another part of the amputee's body will be explained in full detail as the description proceeds. The return of the forearm 1 from its flexed position back into distended position may be gravitational after the air is released from the servomotor 7. It will be appreciated, however, that an extensor spring may be provided for such return motion between the upper arm socket 1' and the lower arm 1 in a manner similar to the mounting of spring 14 or 15. The rotation of the hand members 3 and 5 in one (in FIG. 1 inward) direction is performed by the servomotor 7a acting on shaft 4 through levers 13, 12 and bevel gearing 11. Motor 7a antagonizes a contraction spring 14 which causes members 3 and 5 to perform the (outward) rotation about the wrist shaft 4 in the opposing direction when the compressed fluid is released from the bellows of the servomotor 7a.

The articulately mounted thumb 5 is pivoted toward the metacarpal portion of the hand 3 by the servomotor 7b whose expansive force acting between members 3 and 5a antagonizes the constantly acting spring 15 which tends to impart a distending motion to the thumb 5. The conduits 7c, 7d and 7e, leading from respective servomotors 7, 7a and 7b, are connected with the tank 8 by a common line 16. Various valves and valve actuating means in these conduits will be fully described as the description proceeds. Similarly, the conduits 10b, 10c, leading from servomotors 10, 10a, are connected with the tank 8 via intermediate valve systems shown, for example, in FIG. 8, and through the common supply line 16.

Figure 2:
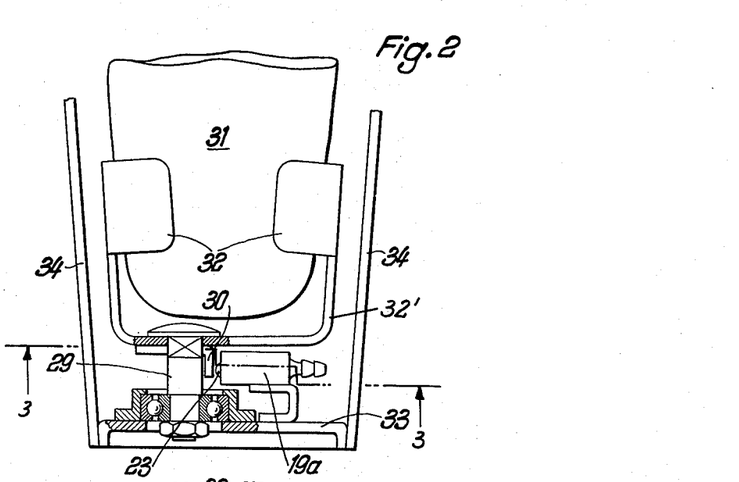
FIG. 2 is a partly sectional side elevation of the housing for an inlet and an exit valve connected with the upper- or forearm stump which directly controls a single motion of a limb portion or of an arresting device.
Figure 3:
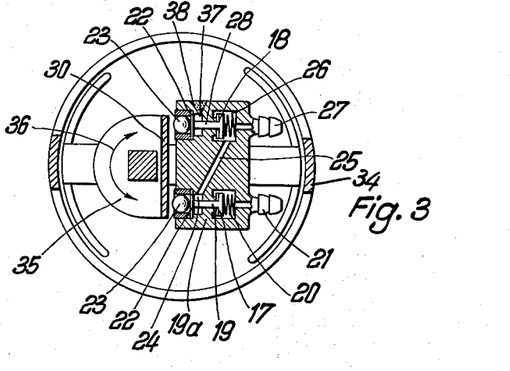
FIG. 3 is a section taken on line 3—3 in FIG. 2.

FIGS. 2 and 3 illustrate one embodiment of the inlet valve 17 and of exhaust valve 18 which control the servomotor 7b for the flexing of thumb 5. Both valves are shown in section in FIG. 3. In accordance with this embodiment of the present invention, at least the inlet valve 17 operates as a reducing valve. It comprises a stem 19 mounted with a certain leeway for oscillatory movement in axial direction in the valve housing 19a. A spring 20 permanently tends to close the valve member 17, and a connector or coupling 21 provides a means for attachment of the conduit 16 leading to the tank 8 (shown in FIG. 1). The free end of valve stem 19 abuts against one surface of a sealing diaphragm 22. The other surface of the diaphragm is in contact with a ball 23 which may partially extend from the valve housing 19a when the inlet valve 17 is closed (as shown in FIG. 3).

The chamber 24, which is adjacent the diaphragm 22, is in communication with the chamber 26 of exhaust valve 18 through a transverse passage 25. The hollow coupling 27 serves as a means for connecting the end of conduit 7e leading, for example, to the servomotor 7b (see FIG. 1). The construction of the exhaust valve 18 is identical with that of valve 17. Thus, its stem 28 has a certain freedom of lateral movement and abuts with its free end against a diaphragm 22 which in turn contacts with a ball 23 partially extending from the valve housing 19a. A spring in the chamber 26 tends to maintain valve 18 in the position shown in FIG. 3.

Valves 17 and 18 are actuated by a tripping member 30 which is rigidly connected with the non-circular portion of a bolt 29. Bolt 29 and tripping member 30 are rotated by the muscles in the fore- or upper arm stump 31. For such purpose, the artificial limb includes a substantially U-shaped bracket 32', having a non-circular bore for the passage of bolt 29 and a pair of suitably shaped feeler flaps 32 which partially embrace the stump 31 and transmit its rotary motion to bracket 32', bolt 29 and tripping cam 30. The common housing 19a of valves 17 and 18 is rigidly connected to the rails 34 which in turn are non-rotatably attached to the thorax or shoulder cup of the amputee.

It is assumed in the following description that the stump 31 is a remainder of the forearm. As it performs an ulna-radial rotary motion in the direction of arrow 35 (see FIG. 3), the tripping cam 30 presses the ball 23 against the diaphragm 22 of the inlet valve 17 which communicates motion to the valve stem 19 to open the inlet valve 17 against the force of spring 20. Compressed air is free to move from the tank 8 through conduit 16, coupling member 21, chamber 24, passage 25, chamber 26 and exhaust valve coupling member 27 into the conduit 7e, and thence into the servomotor 7b (see FIG. 1) to cause the flexion of thumb 5. If the thumb 5 is totally bent, that is, if it abuts against the phalangeal portion of hand member 3, the stump 31 can maintain it in such position by performing an ulna-radial rotary motion in the direction of arrow 36 to return the tripping cam 30 back into its neutral position shown in FIG. 3. The compressed air remains entrapped in the bellows of motor 7b and maintains the thumb 5 in flexed position with a force proportional to the pressure in the bellows. It will be understood that the thumb 5 may perform a partial flexing motion if the cam 30 is returned into its neutral position before the thumb reaches its extreme position against the contracting force of spring 15. The thumb will maintain such intermediate position and will resist the force of the spring 15 with an opposing force proportional with the pressure of compressed air in the partially filled bellows of motor 7b.

The above described system of valves 17 and 18 has a very important advantage, namely: When the valve 17 is open and its motor, in the present instance the servomotor 7b, filled with compressed air, the chamber 24 in valve housing 19a is also filled with fluid under the same pressure which is transmitted to the diaphragm or control member 22 and over ball 23, cam 30 and members 32', 32 to the muscle in stump 31. Thus, the user is well aware of the pressure existing in the bellows of motor 7b and the actuating muscle in the stump 31 actually functions as the spring of a reducing valve. Consequently, the amputee is capable of fully realizing the magnitude of compressing the force which flexes the artificial thumb 5 and also the force with which an article is held between the latter and the phalangeal portion of the hand 3.

An additional advantage of the described valve system is in that the valves 17 and 18 may be tripped entirely independently whereby the artificial limbs controlled by the valves can perform partial or full motions and can be arrested in any desired intermediate position between the two extremes. This represents a considerable improvement over known artificial limbs which can only perform full flexing or distending motion, or partial motions with immediate return of the limb into original position. The movement of the novel limb is more natural, more complex, and is actually quite similar to the motion of the natural limb.

If the user desires to distend the thumb 5 back into its original position, the muscles in the stump perform an ulna-radial rotary motion in the direction of arrow 36. This moves the cam 30 from its neutral position into engagement with the ball 23 of the exhaust valve 18. The ball moves valve stem 28 against the force of spring in the chamber 26 and the fluid is free to escape from the bellows of motor 7b, through conduit 7e, coupling 27, chamber 26 and around stem 28 into the enclosure adjacent the diaphragm 22 in valve 18, and thence into the atomsphere through the exit port 37. The latter is preferably filled with a porous silencing material, for example, a cork 38 of foam rubber or the like. This suppresses undesirable hissing sounds which usually accompany the escape of compressed air.

The disposition of control valves 17, 18 on the body of the amputee naturally depends on the characteristics of each individual case. If there is a stump whose remaining muscles are in good condition and capable of actuating the extensors for the movement of forearm and fingers of the artificial limb, and if this stump is of sufficient length to cause ulna-radial rotary motion of the forearm 1 by its own rotation, then the disposition of valves 17, 18 may follow that schematically represented in FIGS. 4 and 5. The housings 19a of the respective inlet and exhaust valves 17, 18 are attached to a stirrup 39 which partially embraces the brachial stump. If the amputee moves such muscles in the stump which control the flexing of thumb 5, the lever which is articulately connected with the housing 19a of the inlet valve 17 transmits the muscular pressure to the ball 23 which yields and opens the inlet valve through the diaphragm 22 and valve stem 19. The compressed air enters through the hollow coupling member 21 and flows through the two chambers in the valve housing 19a of inlet valve 17 into the connecting conduit 25a and thence through the distributor head 40 into the pipe 7e leading to the servomotor 7b (see FIG. 1). If the muscles controlling the distending motion of the arm and/or thumb 5 are moved, the valve 18 is opened in similar fashion by the ball 23 and the compressed fluid is free to escape back through the conduit 7e, distributor head 40 and port 37 in valve 18, whereupon the spring 15 causes thumb 5 to return back into its distended position.

The above arrangement, similarly to that shown in FIGS. 2 and 3, allows for very fine adjustment and partial motion of artificial limbs by selective movement of controlling muscles in the amputee's stump and corresponding shorter or longer tripping of valves 17, 18. Other muscles in the stump are thereby free to perform or control other motions with very little danger of unintentionally opening or closing one of the valves 17, 18. This is particularly important because, as hereinabove stated, other muscles in the stump may be used for directly imparting rotary motion to the forearm. However, other brachial muscles or thorax muscles may be employed for selective tripping of the valves.

Figure 6:
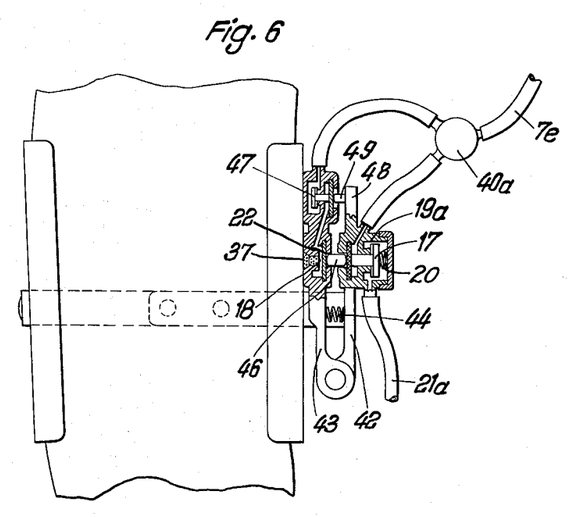
FIG. 6 is a side elevational view in partial section of a rigidly mounted inlet valve mechanically connected with a pivotable exhaust valve and a closing valve between the exhaust valve and the conduit leading to the servomotor, which may all be actuated by a single stump muscle.
Figure 7:
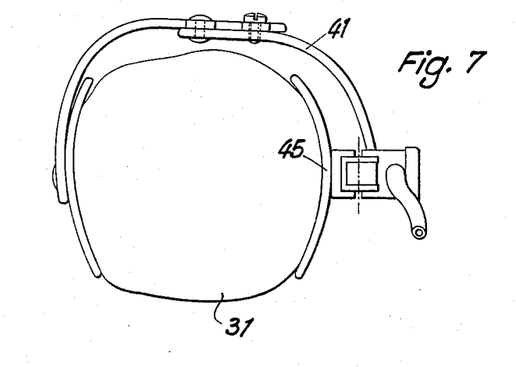
FIG. 7 is a bottom end view of the structure shown in FIG. 6.

FIGS. 6 and 7 illustrate a further modification in the disposition of valves 17, 18 which brings especially the thumb motion even closer to the articulation of a human hand. Stirrup 41 is clamped to the forearm stump 31 by a pair of suitably shaped retaining elements 45, one of which is articulately connected with the stirrup by two levers 42, 43. The lever 42 is rigid with the stirrup 41 and carries the inner lever 43, connected thereto by a pivot pin. The lever 43 supports the housing of the exhaust valve 18 and is urged against the stirrup 41 by a constantly acting expansion spring 44. The housing 19a of inlet valve 17 is rigidly connected with the lever 42. If the amputee contracts the muscles in the forearm stump 31, he thereby causes the adjacent lever 43 to execute an outward motion toward the stationary lever 42. This motion results in tripping of valves 17, 18. As a first step, the pivoting lever 43 brings the diaphragm 22 of the inlet valve into contact with a pin 46 which results in closing of the exhaust valve 18 as its diaphragm yields and seals the exit port 37. If the muscular pressure continues to rise, the pin 46 opens inlet valve 17 by bearing against the diaphragm 22 which yields and displaces the valve 17 against the force of spring 20. The compressed fluid moves through conduit 21a, through housing 19a of the inlet valve and distributor head 40a into the pipe 7e leading to the flexor motor 7b, which consequently actuates the thumb 5 to bring it into contact with the phalangeal portion of member 3 (see FIG. 1).

If the muscular pressure is eased, the inlet valve is first to close whereupon the diaphragm 22 of the exhaust valve 18 moves away from the port 37 to provide an escape route for the compressed fluid back through the pipe 7e, distributor head 40a, the tubing tap connecting member 40a with the housing of valve 18 and through port 37 into atmosphere. The thumb returns back into its original distended position by the action of its spring 15.

Due to the mechanical connection of valves 17 and 18 by the intermediate pin 46, a fluctuation in the pressure exerted by the artificial thumb is made possible.

To provide for arresting of the thumb in any intermediate position, the system of FIGS. 6 and 7 includes an additional closing valve 47 which is installed between the exit valve 18 and the pipe 7e leading to the flexor motor 7b. Closing valve 47 is mounted on the movable lever 43 and is tripped by the pin 49 on an extension 48 of the stationary lever 42. This valve operates as follows: If the lever 43 is pivoted against the stationary member 42, the valve 47 is first to open, followed by the closing of exhaust valve 18 and the opening of inlet valve 17 in that order. If the amputee slackens the muscles which actuated the lever 43, the latter returns back into its original position by the force of expansion spring 44. The valve 17 now closes and the exhaust valve 18 opens to permit escape of fluid from the bellows of motor 7b. However, if the actuating muscle is rapidly returned into idle position, the members 48, 49 permit closing of valve 47 practically simultaneously with the movement of membrane 22 in the exit valve 18 from the port 37, and the compressed fluid is prevented from escaping the flexor motor 7b. Thus, the thumb 5 remains in its position which may be anywhere between the full distension and complete flexion, as desired by the amputee. If it is now desired to return the thumb 5 back into distended position, a slight movement of the muscles in stump 31 is sufficient to open the valve 47 without closing the exhaust valve 18 which latter now permits escape of fluid through the exit port 37 whereupon the thumb returns into fully distended position under the influence of constantly acting spring 15.

It will be appreciated that the valve 47 represents an additional modification for very fine articulation of an artificial limb and may be omitted, if desired. By omitting the valve 47, the limb could still imitate the fine natural articulations but it could not be maintained in a desired position by simply returning the actuating muscle into idle or neutral position. Thus, the muscle remains under a certain strain as long as the limb is in an intermediate position and can be slackened only if the limb is fully flexed or fully distended.

Figure 8:
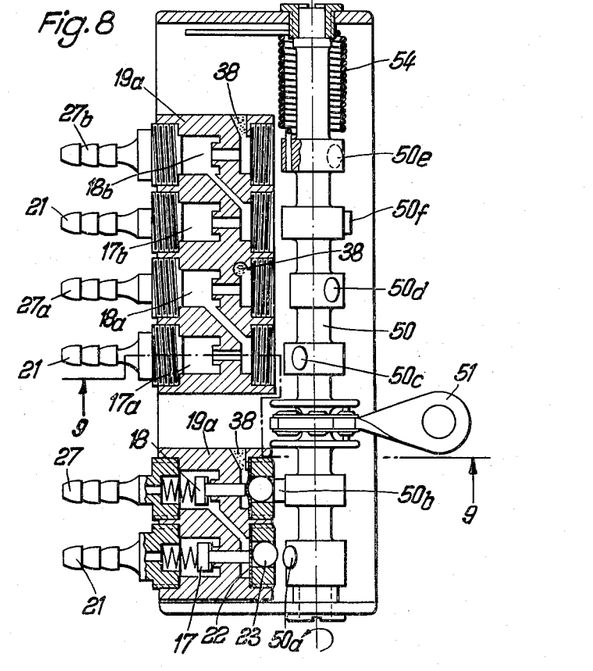
FIG. 8 is a longitudinal section through the common housing of three inlet and three exhaust valves including a traction operated tripping member.
Figure 9:
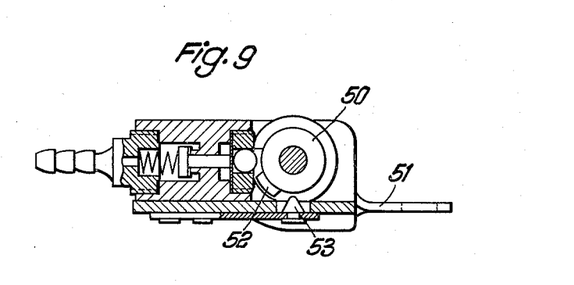
FIG. 9 is a section taken on line 9—9 in FIG. 8.

In cases of amputations above the elbow, that is, when a complete artificial arm is necessary, provision must be made for a series of servomotors to generate the requisite motions of the fingers, wrist, forearm and elbow, as is shown in FIG. 1. This in turn necessitates the provision of various arresting devices at each point of articulation in order to insure full usefulness of the artificial limb. The arresting devices maintain certain parts of the limb in a desired position against relatively large external forces which may act against the member. It is advisable in such cases to provide a single actuating device 50 for the respective inlet and exhaust valves 17, 17a, 17b and 18, 18a, 18b of a plurality of servomotors, as is illustrated in FIGS. 8 and 9. Because of the detailed illustration in FIGS. 2 and 3 of the construction of inlet and exhaust valves, only the valves 17 and 18 are shown in section in FIG. 8, while the valves 17a, 18a and 17b, 18b are represented very diagrammatically. The inlet and exhaust valves may be mounted in a single or a twin valve housing 19a. Couplings 21 of the inlet valves are all connected to a common source of compressed fluid (not represented), for example, the line 16 leading to the tank 8 (see FIG. 1). The couplings 27, 27a and 27b of respective exhaust valves 18, 18a and 18b are individually connected with the pipes 7e, 7d and 7c of the servomotors 7b, 7a and 7, respectively. According to FIG. 8, the serially arranged valves are all actuated by a common camshaft 50 which is rocked by the element 51. The latter may be installed adjacent the amputee's scapula in the manner illustrated in FIG. 14. By bending the scapular muscles in forward direction, the user pulls on the member 51 and thus rocks the camshaft 50 to the extent controlled by the shoulder movement, whereby the individual cams 50a to 50f trip the inlet and exhaust valves in a predetermined sequence. It is preferred to arrange the valves in such sequence that the rocking shaft 50 through its cam 50a first actuates the valve 17 which controls the servomotor 7b whose function is to impart flexion to the thumb 5. The adjacent exhaust valve 18 controls the distending movement of the thumb. On further rotation of the camshaft 50, the inlet valve 17 is tripped for a second time to again close the hand.

An additional cam 52 is provided on the shaft 50 between cams 50b and 50c (see FIG. 9) which, upon second opening of inlet valve 17, abuts against a yieldably mounted locking pin 53. The amputee is thus warned from an unintentional further rotation of the cam 50 if he desires to maintain the thumb 5 in flexed position.

After overcoming the resistance of locking pin 53, the amputee can further rotate the shaft 50 to cause tripping of inlet valve 17a by the cam 50c. The coupling 21 of the valve 17a is now in communication with the conduit 10b leading to the servomotor 10 of the arresting pin 9 through the interior of valves 17a, 18a and the coupling 27a to which the conduit 10b is connected. A further rotation of the shaft 50 brings cam 50d into contact with the valve 18a which opens and permits escape of compressed fluid from the motor 10 through the exit port 37. The arresting pin 9 is retracted by its spring (see FIG. 1) and the elbow joint is again free to articulate. On further rotation of the camshaft 50, the amputee trips the exhaust valve 18b by means of cam 50e to release the fluid from servomotor 7 which thus permits the forearm 1 to distend by gravity as the fluid escapes through the exit port 37 in valve 18b. As before stated, a resilient element may assist the gravitational distension of the forearm.

Upon further rotation of the shaft 50, cam 50f trips the inlet valve 17b which introduces fluid into the motor 7 through the coupling 27b and conduit 7c. Consequently, the forearm is flexed into or over its position shown in FIG. 1. By a quick motion of the shoulders, the amputee may release the trigger member 51 whereupon the coil spring 54 returns the shaft 50 back into its neutral position. During such return rotation of the shaft, the adjacent valves are opened and closed in such rapid sequence that their actuation has no appreciable effect on the servomotors which they control. The parts of the multi-joint artificial limb (in the above described case the thumb and the forearm) remain locked in their respective positions.

Figure 10:
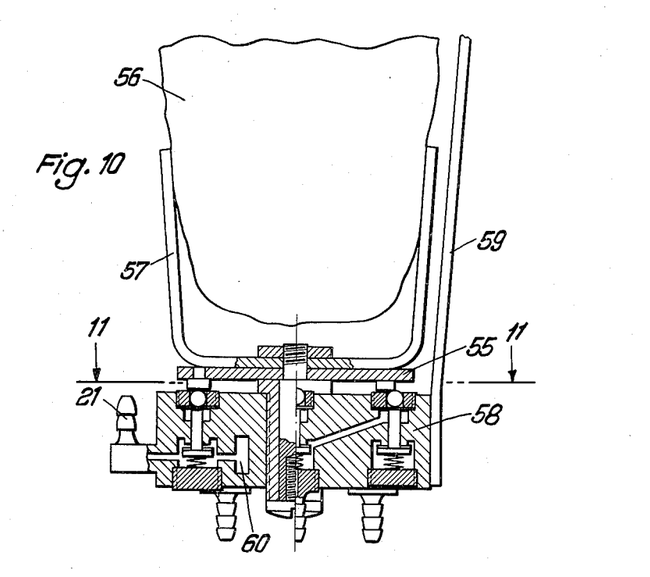
FIG. 10 is a section taken on line 10—10 in FIG. 11, illustrating in section another form of the multi-valve housing and stump controlled tripping means therefor.
Figure 11:
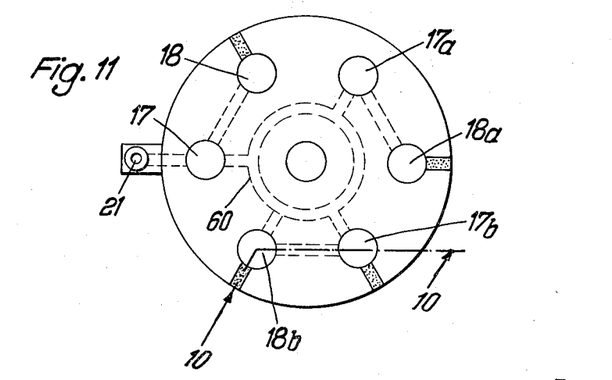
FIG. 11 is a schematic top plan view of the multi-valve housing, substantially as seen from the line 11—11 in FIG. 10 in the direction of arrows.

It will be noted that the valves need not be mounted serially but may be grouped in various different manners. For example and as shown in FIGS. 10 and 11, the valves may be disposed on the periphery of a circle and actuated by a circular cam plate 55. This system is particularly advantageous if at least a short brachial stump 56 is available which is then employed for rotation of the member 55. In a similar manner to that of the embodiment of FIG. 2, the stump 56 transmits motion to the cam plate 55 through a suitably shaped member 57 which is connected thereto. The inlet valves 17, 17a, 17b and the exhaust valves 18, 18a, 18b are mounted in a circular casing 58 which is connected with the amputee's shoulder cup by means of rails 59.

Of course, the valve casing 59 may be mounted adjacent the user's shoulders (see the position of elongated valve housing 19a in FIG. 14) and actuated by a motion of shoulder blades through one or more suitable connecting and motion-transmitting elements. The main advantage of this circular valve system is in that the fluid supply coupling 21 communicates with an annular channel 60 in the valve housing 59 which is in communication with the interior of all inlet valves 17, 17a and 17b.

The provision of a greater number of inlet and exhaust valves in a common housing, as shown in FIGS. 8 to 11, does not preclude a mechanical coupling of the inlet and exit valves controlling the motion of individual articulate parts of the artificial limb. This adds to the precision of movement and to the sensitivity of the limb. It is also evident that a greater number of inlet and exhaust valves could be jointly controlled by a single member and a single muscular movement. This is especially desirable to generate motions in a multi-joint artificial limb which should execute a great variety of articulations. This, however, often creates certain difficulties as the actuating muscle or muscle group is subjected to excessive strain and the relatively complicated control of a great number of valves requires from the amputee a constant mental concentration and consequent tiredness leading to errors in the articulation of the limb.

Figure 12:
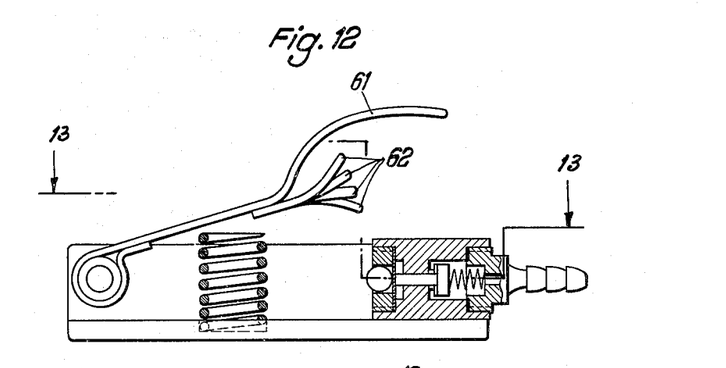
FIG. 12 is a partly sectional side elevational view of a modified multi-valve housing, with muscle-operated pivotable tripping lever therefor.
Figure 13:
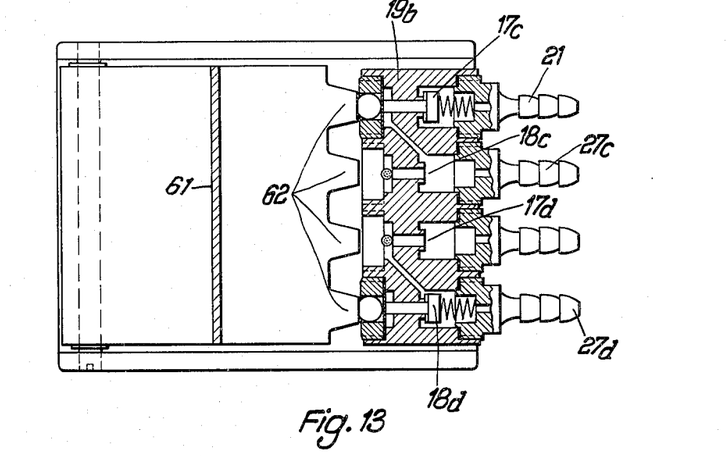
FIG. 13 is a partial longitudinal section taken on line 13—13 in FIG. 12.

The present invention provides a solution for this problem in that a single muscle group preferably controls and actuates only a limited number of inlet and exhaust valves, usually not more than the number shown in FIGS. 8 to 11, for generation of motion of the thumb (valves 17, 18), of the elbow joint arresting device 9 (valves 17a, 18a and cams 50c, 50d), and of the forearm flexing motor 7 (valves 17b, 18b and cams 50e, 50f). The valves controlling the motor 7a for rotation of the hand and motor 10a which actuates the arresting device 9a, are combined in a separate housing and derive their motion from a different muscle group, as is shown in FIGS. 12 and 13. Two inlet valves 17c, 17d and two exhaust valves 18c, 18d are housed in a common casing 19b. The casing carries a lever 61 which supports a number of cams 62 at different levels, as is best shown in FIG. 12. Lever 61 is pivotally connected with the casing 19b and is antagonized in its motion toward the serially arranged valves by a constantly acting expansion spring which tends to maintain the cams 62 away from contact with the valves. When the lever 61 is depressed, the cams successively trip the valves 17c, 18c, 17d and 18d in that order. The valve 17c controls the entry of compressed fluid into the servomotor 10a which oscillates the wrist arresting pin 9a (see FIG. 1). When the lowermost of cams 62 opens the inlet valve 17c fluid flows through the coupling 21, interior of valve 17c, the transverse passage leading into the exhaust valve 18c, through the exhaust valve coupling member 27c and the conduit 10c into the motor 10a to move the arresting pin 9a into a recess in the metacarpal member 3 and prevent rotation of the latter. On further depression of the lever 61, the second cam 62 opens the exhaust valve 18c to release the compressed fluid medium from the bellows of servomotor 10a and cause retraction or easing of pressure of the arresting pin 9a. The adjacent inlet valve 17d is opened by the third cam 62 to permit flow of compressed fluid from tank 8 and via conduit 16, coupling member and interior of valve 17d, interior of valve 18d, coupling member 27d and conduit 7d into the servomotor 7a whose bellows expands and thereby rotates the members 3 and 5 outwardly about or with the shaft 4. The articulate connection between the motor 7a and shaft 4 includes the pivoting rocker arm 13 whose projection engages the lever 12 on the shaft of the larger bevel gear 11 and the meshing bevel at the upper (in FIG. 1 lower) end of shaft 4. Finally, if the exhaust valve 18d is tripped by the uppermost cam 62 (see FIG. 12), the fluid may escape from the motor 7a, which results in an inward rotation of the artificial hand. It will be appreciated that the functions of spring 14 and of servomotor 7a may be reversed in that the motor could generate the inward rotation of the hand. The valve casing 19b with lever 61 may be mounted adjacent any other muscle group in the amputee's torso or the fore- or upper arm of the other hand, if desired. As described in connection with camshaft 50 shown in FIGS. 8 and 9, a quick release of the cammed lever 61 causes an opening or closing of valves 18d, 17d, 18c and 17c in such quick succession that its motion has no appreciable effect on the servomotors 7a and 10a, or on the angular position of the artificial hand.

Figure 14:
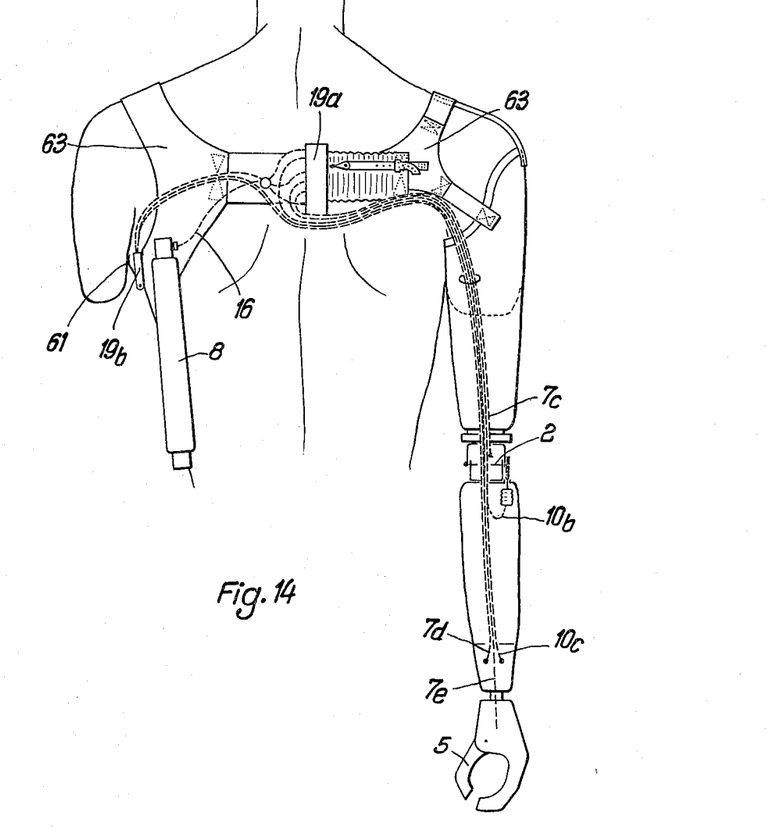
FIG. 14 is a schematic rear view of the amputee's thorax with one artificial limb attached to the right brachial stump, and an external container for compressed fluid as well as two separate valve housings connected to the straps in the scapular and left axillar region, respectively.

FIG. 14 illustrates the disposition of various control apparatus on the amputee's thorax in case of a complete amputation of his right arm or, as shown, when only a short brachial stump is left. The actuation of the thumb 5, of the elbow joint 2 and of the elbow arresting device 9 is controlled from a valve housing 19a which may be constructed in the manner shown in FIGS. 8 and 9, and attached to a strap between the amputee's shoulder blades. The inlet valves 17c, 17d and exhaust valves 18c, 18d are combined in a second housing 19b, and attached to a strap on the user's thorax directly below the left-hand axilla so that its cammed lever 61 may be actuated by the left hand of the user. For better illustration, the compressed fluid tank 8 is shown as separately attached to the strap 63 adjacent the left-hand dorsal section. The separation of the valves in two housings 19a, 19b brings about the additional advantage that the artificial hand may be rotated on or with shaft 4 independently of other motions which the articulately joined parts of the artificial arm may perform. It has proven to be of advantage if the conduits 7c, 7d, 7e and 10b, 10c, shown in dotted lines, are hidden in the shoulder straps 63 as much as possible, together with the fluid supply conduit 16 which feeds the valves in housings 19a, 19b from the tank 8.

Figure 15:
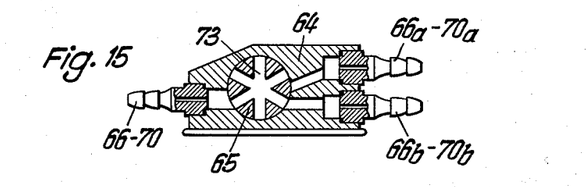
FIG. 15 is a transverse section through a switchover device which selectively connects the servomotors of the right or left artificial limb with the air container.

As long as the amputee must control the movements of a single artificial limb, for example, the right arm, he may with certain training become accustomed to the controlling muscles other than those remaining in the amputated limb. However, if he needs two artificial arms, the double controls and intense concentration result in understandable difficulties, such as frequent errors in operation and weariness after a short period of use. According to the present invention, this may be overcome by the provision of single control apparatus 19a (see FIGS. 8 to 11), 19b (see FIGS. 12, 13) for both artificial limbs together with switchover means shown in FIGS. 15 to 17, which latter device can alternately connect the control apparatus with the servomotors and arresting devices of the left or right artificial arm.

Figure 17:
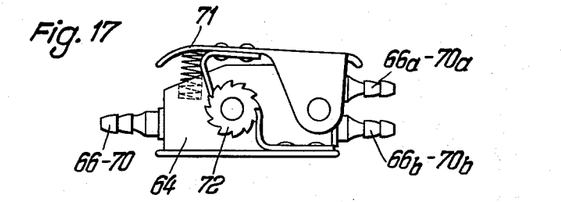
FIG. 17 is a bottom end view of the device shown in FIG. 16.

The switchover apparatus comprises a housing 64 for the two-way valve 65, the housing also carrying a plurality of hollow left-hand coupling members 66 to 70, and ten right-hand couplings 66a—70a and 66b—70b which are arranged in two rows. Coupling members 66 to 70 are connected by means of preferably flexible conduits (not shown) with the couplings 27 and 27a—27d (see FIGS. 8 to 13). The couplings 66a—70a and 66b—70b which are arranged in two rows. Coupling members 66 to 70 are connected by means of preferably flexible conduits (not shown) with the couplings 27 and 27a—27d (see FIGS. 8 to 13). The couplings 66a—70a are connected with the fluid conduits leading to the left arm, and the couplings 66b—70b are terminals for the conduits leading to the right arm of the double amputee. The stem of the two-way valve 65 carries an exterior ratchet 72 which may be engaged and intermittently rotated by the pawl connected to a pivoted lever 71 when the latter moves against the force of a constantly acting expansion spring, as is shown in FIG. 17. The valve member 65 has a plurality of transverse bores 73 providing passages between the interior of couplings 66—70 and selectively the couplings 66a—70a or 66b—70b of the respective left or right artificial arm. In the position of valve member 65 shown in FIG. 15, communication is established between the members 66—70 and couplings 66b—70b leading to the servomotors in the amputee's right arm. The user is thus able to move the parts of the right arm by selectively actuating the inlet and exhaust valves shown in FIGS. 8 to 13. Should he then desire to execute certain movements with the left arm, the motion of a third muscle group causes depression of the lever 71 and consequent partial rotation of ratchet 72 and valve member 65 to connect the couplings 66—70 with the members 66a—70a providing for communication of fluid with the servomotors in the left arm. The amputee is then able to control the movements of the left arm by actuating the same valves in housings 19a and 19b which were previously employed for articulation of the right arm.

Figure 16:
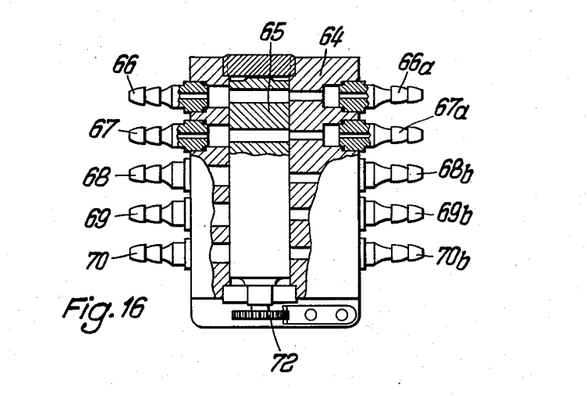
FIG. 16 is a partial longitudinal section through the apparatus of FIG. 15.

By way of example, FIG. 16 illustrates schematically and in somewhat greater detail the construction of the switchover device 64. The couplings 70, 70a and 70b control the operation of servomotors 7b for articulation of the right- or left thumb 5 (see FIG. 1). The couplings 69, 69a, 69b control the motors 10 which actuate the elbow arresting devices 9. Motors 7 for actuation of the left- or right hand elbow joint are supplied by the couplings 68, 68a, 68b; members 67, 67a, 67b are connected with the motors 10a which control the wrist motion arresting pins 9a; and couplings 66, 66a, 66b supply the fluid to the motors 7a which cause counterclockwise rotary motion of the hands. The switchover device may be mounted in the right axilla of the amputee (see FIG. 14) or the members 71, 72 thereof may be actuated by a different muscle group of the amputee's thorax.

Obviously, the switchover device can be provided not only in cases of double brachial amputations, but for use only with artificial hands as well. Thus, it may be employed with advantage to switch over relatively simple inlet and exit valves shown in FIGS. 4 and 5, or in FIGS. 6 and 7. This is especially desirable if the one or the other forearm stump is rather short or if the stump muscles are damaged.

Figure 4:
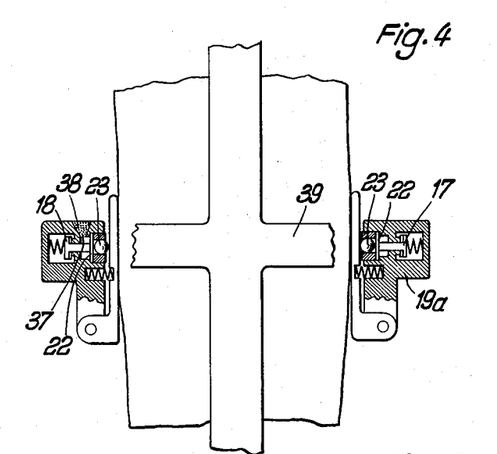
FIG. 4 is a schematic partly sectional representation of two valve housings operatively mounted by a common stirrup on the amputee's stump.
Figure 5:
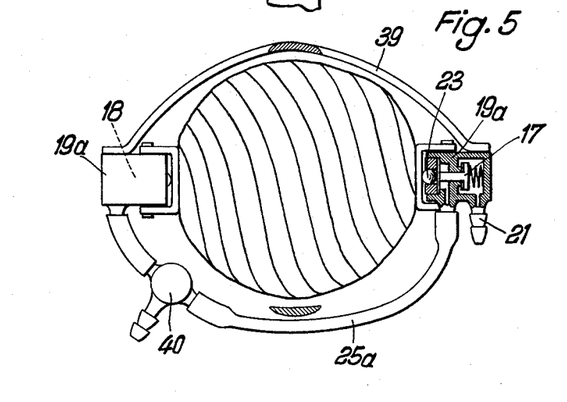
FIG. 5 is a partly sectional bottom end view of FIG. 4.

The arrangement of valves in accordance with FIGS. 4 and 5 has the additional advantage that the remaining stump muscles may control the valve actuating levers with great precision. It is therefore possible and often desirable to duplicate or further multiply the system of FIGS. 4 and 5 for the control of a single artificial hand (rotation and arresting of wrist and articulation of the thumb), or to combine it with that shown in FIGS. 2 and 3 or any of those shown in FIGS. 8 to 11. This provides for articulation of one or more phalangae in addition to the movement of thumb 5. As above indicated, the system of FIGS. 4 and 5 could as well be employed for control of the servomotor 7a which generates rotation of the carpus.

As a further modification, instead of being suspended on the thorax or a stump, the valve systems and their housings shown in FIGS. 8 to 13 may be mounted inside a hollow artificial arm and the valves tripped by any suitable arrangement, for example by Bowden wires leading to and oscillated by certain muscles in the amputee's body. The disposition of such Bowden wires would be similar to that of the fluid supply conduits shown in dotted lines in FIG. 14.

Finally, the present invention may be employed with advantage to control certain motions of an artificial leg. For example, a brake or an arresting pin for the knee joint could be operated by servomotors and valves of several previously disclosed systems.

It will be understood that each of the elements described above, or two or more together, may also find a useful application in other types of artificial limbs for amputees differing from the types described above.

While the invention has been illustrated and described as embodied in artificial limbs for amputees, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An artificial limb for use by an amputee, comprising, in combination, a pair of articulately connected parts adapted to move with respect to one another in two directions, a pneumatic servomotor operatively connected with said parts for moving one thereof in one direction, a supply of compressed fluid, a conduit for connecting said supply of compressed fluid with said servomotor, an inlet valve in said conduit, an exhaust valve in said conduit between said inlet valve and said servomotor, a closing valve in said conduit between said exhaust valve and said servomotor, and means for actuating said valves in a predetermined sequence, said last named means including an element movably responsive to the impulses of and operatively adjacent a muscle of the amputee, the extent of movement of said element depending on the magnitude of muscular impulses of the amputee, and means responsive to movements of said element for opening said closing valve in reply to muscular impulses of a first magnitude, for closing said exhaust valve in reply to muscular impulses of a second magnitude while said closing valve remains open, for opening said inlet valve in reply to muscular impulses of a third magnitude while said closing valve remains open and said exhaust valve remains closed, and for sequentially closing said inlet valve, opening said exhaust valve and closing said closing valve when the magnitude of the muscular impulses decreases.

2. An artificial limb for use by an amputee, comprising, in combination, a pair of articulately connected parts adapted to move relative to one another in two directions, arresting means for preventing movement of one of said parts with respect to the other of said parts, a first pneumatic servomotor operatively connected with one of said parts for moving same in one direction, a second pneumatic servomotor operatively connected with said arresting means for actuating same, a source of compressed fluid, a first and second conduit for connecting said first and said second servomotor with said source of compressed fluid, an inlet valve in each of said conduits, an exhaust valve in each of said conduits between one of said inlet valves and one of said servomotors, means for selectively actuating said valves, said last named means including a tripping element movably responsive to impulses of a muscle of the amputee for conveying said impulses to and for actuating selected ones of said inlet valves and said exhaust valves in a predetermined sequence in dependency on the magnitude of said impulses, and constantly acting means for returning said tripping element toward and into idle position when impulses of diminishing magnitude are conveyed thereto, whereby the amputee may determine which of said valves and of said servomotors is actuated by said tripping element in response to impulses communicated thereto by said muscle.

3. A multi-joint artificial limb for use by an amputee, comprising, in combination, a plurality of articulately connected parts, arresting means at the points of articulation of said parts, a pneumatic servomotor operatively connected with each of said parts and with each of said arresting means for moving said parts in one direction and said arresting means in a direction to lock the points of articulation of said parts, respectively, a supply of compressed fluid, a plurality of inlet valves one for each of said servomotors, conduit means for connecting said inlet valves with said supply of compressed fluid, a plurality of conduits for connecting each of said inlet valves with a respective one of said servomotors, an exhaust valve in each of said conduits, and means for selectively actuating said first inlet valves and said exhaust valves including a rotatably mounted cammed element operatively connected with and receiving impulses for rotary motion from a muscle of the amputee, said cammed element including means for opening and closing said inlet valves and for opening and closing said exhaust valves of each of said servomotors in a sequence dependent on the extent of rotary motion imparted to said cammed element by said muscle, and means for returning said cammed element into original position when the impulses of said muscle communicated to said cammed element decreases.

4. A multi-joint artificial limb for use by an amputee, comprising, in combination, a plurality of articulately connected parts, arresting means at the points of articulation of said parts, a pneumatic servomotor operatively connected with each of said parts and with each of said arresting means for moving said parts in one direction and said arresting means in a direction to lock the points of articulation of said parts, respectively, a supply of compressed fluid, a plurality of inlet valves one for each of said servomotors, conduit means for connecting said inlet valves with said supply of compressed fluid, a plurality of conduits for connecting each of said inlet valves with a respective one of said servomotors, an exhaust valve in each of said conduits, said inlet valves and said exhaust valves of said servomotors being disposed in at least two groups each having a common housing, and means for selectively actuating said inlet valves and said exhaust valves including a cammed element rotatably mounted in each of said housings and each rotatable by impulses communicated thereto by separate muscles of the amputee, each of said cammed elements including means for tripping said valves in said housings in a sequence determined by the extent of rotary motion of said cammed elements, and constantly acting means associated with each of said cammed elements for returning same into original position on decrease of muscular impulses communicated to said cammed elements.

5. An artificial arm, comprising in combination, an upper arm, a forearm, and a hand, an articulate elbow joint between said upper arm and said forearm, an articulate joint in said hand for permitting opening and closing of said hand, means for arresting said elbow joint, a first pneumatic servomotor for closing said hand, a second pneumatic servomotor for moving said arresting means into locking position, a third pneumatic servomotor for flexing said forearm with respect to said upper arm, first constantly acting means for opening said hand when said first servomotor is idle, a second constantly acting means for releasing said means for arresting said elbow joint when said second servomotor is idle, a third constantly acting means for distending said forearm when said third servomotor is idle, a supply of compressed fluid, a first inlet valve connected with said supply of compressed fluid and said first servomotor, a second inlet valve connected with said supply of compressed fluid and said second servomotor, a third inlet valve connected with said supply of compressed fluid and said third servomotor, a first exhaust valve between said first inlet valve and said first servomotor, a second exhaust valve between said second inlet valve and said second servomotor, a third exhaust valve between said third inlet valve and said third servomotor, said inlet valves being normally closed and said exhaust valves being normally open, said inlet valves and said exhaust valves having a common housing, a tripping member in said housing and operatively connected with a muscle of the amputee, said tripping member being adapted to execute movements in response to impulses received from said muscle, a plurality of cams connected with said tripping member and adapted to actuate said valves in said housing in such sequence that said hand is closed, opened and thereupon again closed by said first servomotor and said first constantly acting means, respectively, said elbow is thereupon locked and released by said second servomotor and said second constant acting means, respectively, and said forearm is distended and thereupon flexed by said third constantly acting means and said third servomotor, respectively, and a fourth constantly acting means for returning said tripping member back into idle position when said impulses communicated to said tripping member decrease.

6. An artificial limb for use by an amputee, comprising, in combination, a pair of articulately connected parts adapted to move relative to one another in two directions, arresting means for preventing movements of one of said parts with respect to the other of said parts, a first pneumatic servomotor operatively connected with one of said parts for moving same in one direction, a second pneumatic servomotor operatively connected with said arresting means for actuating same, a source of compressed fluid, a first and a second conduit for connecting said first and said second servomotors with said source of compressed fluid, an inlet valve in each of said conduits, an exhaust valve in each of said conduits between one of said inlet valves and one of said servomotors, means for selectively actuating said valves, said last named means including a tripping element movably responsive to impulses of a muscle of the amputee for conveying said impulses to and for actuating selected ones of said inlet valves and said exhaust valves in a predetermined sequence in dependency on the magnitude of said impulses, constantly acting means for returning said tripping element toward and into idle position when impulses of diminishing magnitude are conveyed thereto, whereby the amputee may determine which of said valves and of said servomotors is actuated by said tripping element in response to impulses communicated thereto by said muscle, and means associated with said tripping element for indicating the position thereof to said muscle, said last named means including a yieldable member in the path of movement of said tripping element, and spring means for permanently urging said member in a direction to obstruct the movement of said tripping element.

7. An artificial arm articulable by the stump of an amputee, comprising, in combination, a plurality of articulately connected parts, pneumatic servomotors operatively connected with each of said parts for imparting movements thereto, a supply of compressed fluid, conduit means between said servomotors and said supply of compressed fluid, and operating means for said servomotors including a valve housing, means for connecting said valve housing to the body of the amputee, a plurality of inlet valves and exhaust valves in said valve housing one for each of said servomotors, each of said inlet valves being in communication with said conduit means and with one of said exhaust valves, and each of said exhaust valves being connected with one of said servomotors, and a tripping member for said inlet valves and said exhaust valves connected with said stump and responsive to movements thereof for actuating said inlet valves and said exhaust valves in a sequence corresponding to the extent of movements imparted to said tripping member by said stump.

8. In combination with a pair of artificial arms each having a plurality of articulately connected parts: a pneumatic servomotor for at least some of said parts in each of said artificial arms for imparting movements thereto, a supply of compressed fluid, an inlet valve and an exhaust valve in communication with said inlet valve for each of said servomotors in one of said arms, conduit means for connecting said inlet valves with said supply of compressed fluid, a two-way valve connected with each of said exhaust valves and with each of said servomotors in said arms and adapted to alternately connect said inlet valves and said exhaust valves with said servomotors in one of said arms, a first actuating device for said inlet valves and said exhaust valves, and a second actuating device for said two-way valve, each of said actuating devices including a tripping means attached to the body of the amputee and responsive to muscular impulses communicated thereto for actuating said inlet valves and exhaust valves in a predetermined sequence, and for connecting said inlet valves and exhaust valves with said servomotors in one of said arms, respectively.

9. An artificial limb for use by an amputee, comprising, in combination, a plurality of articulately connected parts, a pneumatic servomotor operatively connected with each of said parts for imparting motions thereto, a supply of compressed fluid, conduit means between said supply of compressed fluid and each of said servomotors, and servomotor operating means including inlet valve means in said limb, exhaust valve means in said limb, and actuating means for said inlet valve means and said exhaust valve means, said last named means including a plurality of Bowden wires connected with a selected body portion of the amputee and responsive to movements of said body portion for actuating said inlet and exhaust valve means in a sequence depending on the extent of movements of said body portion, said Bowden wires being connected with said inlet valve means in such manner that the pressure in said inlet valve means is communicated to said body portion when said inlet valve means are actuated by said Bowden wires.

10. An artificial limb for use by an amputee comprising, in combination, a plurality of articulately connected parts; a pneumatic fluid servomotor means operatively connected to one of said parts for imparting motions thereto; a supply for compressed fluid; means for conducting compressed fluid from said supply of compressed fluid to said pneumatic fluid servomotor means; valve means in said conducting means for closing and opening the same; a control arrangement including a support formed with a pressure chamber and at least one control member responsive to variations of fluid pressure in said pressure chamber and movable relative to said support between a rest position and a controlling position by variation of pressure of fluid conveyed to said pressure chamber; a conduit connecting said pressure chamber in said control arrangement to one of said means whereby said fluid in said means is partly conveyed to said pressure chamber so as to move said control member between said controlling position and said rest position upon variation of the pressure of said fluid; and means for mounting said control arrangement on the body of the amputee so that the amputee is adapted to feel such variations of pressure and to operate said valve means accordingly.

11. An artificial limb for use by an amputee comprising, in combination, a plurality of articulately connected parts; a pneumatic fluid servomotor means operatively connected to one of said parts for imparting motions thereto; a supply for compressed fluid; means for conducting compressed fluid from said supply of compressed fluid to said pneumatic fluid servomotor means; valve means in said conducting means for closing and opening the same; a control arrangement including a support formed with a pressure chamber and at least one control member responsive to variations of fluid pressure in said pressure chamber and movable relative to said support from a rest position into a controlling position by increase of pressure of fluid conveyed to said pressure chamber; a conduit connecting said pressure chamber in said control arrangement to one of said means whereby said fluid in said means is partly conveyed to said pressure chamber so as to move said control member upon increase of the pressure of said fluid from said rest position to said controlling position thereof; and means for mounting said control arrangement on the body of the amputee with said control member located in its rest position adjacent the skin of the amputee and movable upon increase of fluid pressure in direction toward the same, so that the amputee is adapted to feel such variations of pressure and to operate said valve means accordingly.

12. An artificial limb for use by an amputee comprising, in combination, a plurality of articulately connected parts; a pneumatic fluid servomotor means operatively connected to one of said parts for imparting motions thereto; a supply for compressed fluid; means for conducting compressed fluid from said supply of compressed fluid to said pneumatic fluid servomotor means; valve means in said conducting means for closing and opening the same; a control arrangement including a support formed with a pressure chamber and at least one control member responsive to variations of fluid pressure in said pressure chamber and movable relative to said support between a rest position and a controlling position by variation of pressure of fluid conveyed to said pressure chamber; a conduit connecting said pressure chamber in said control arrangement to one of said means whereby said fluid in said means is partly conveyed to said pressure chamber so as to move said control member between said controlling position and said rest position upon variation of the pressure of said fluid; and valve actuating means connected to the muscle of the amputee responsive to the movement thereof, said control member being located between said valve actuating means and said valve means to transmit to said valve means impulses from the actuating muscle and to convey to the actuating muscle variation of pressure of fluid conveyed to said controlling member so that the amputee is adapted to feel such variations of pressure and to operate said valve actuating means accordingly.

13. An artificial limb for use by an amputee comprising, in combination, a plurality of articulately connected parts adapted to move with respect to one another in two directions; a pneumatic fluid servomotor means operatively connected to one of said parts for imparting motions thereto in one direction and for arresting said parts in a predetermined position; constantly acting means operatively connected with said one part for moving the same in the other direction; a supply for compressed fluid; means for conducting compressed fluid from said supply of compressed fluid to said pneumatic fluid servomotor means; valve means in said conducting means for closing and opening the same; a control arrangement including a support formed with a pressure chamber and a control member responsive to variations of fluid pressure in said pressure chamber and movable relative to said support between a rest position and a controlling position by variation of pressure of fluid conveyed to said pressure chamber; a conduit connecting said pressure chamber in said control arrangement to said valve means whereby said fluid in said means is partly conveyed to said pressure chamber so as to move said control member between said controlling position and said rest position upon variation of the pressure of said fluid; and means for mounting said control arrangement on the body of the amputee so that the amputee is adapted to feel such variations of pressure and to operate said valve means accordingly.

14. An artificial limb for use by an amputee comprising, in combination, a plurality of articulately connected parts; at least one pneumatic fluid servomotor operatively connected to one of said parts for imparting motions thereto; a supply of compressed fluid; conduit means between said supply of compressed fluid and said servomotor; servomotor operating means including valve means in said conduit means for selectively providing communication between said supply of compressed fluid and said servomotor, for maintaining a given pressure in said servomotor produced by the fluid supplied thereto, and for providing communication between said servomotor and the atmosphere to relieve said pressure in said servomotor, and valve actuating means connected to a muscle of said amputee responsive to the movements thereof for actuating said valve means, said valve actuating means including controlling means subjected to the fluid pressure in said servomotor and movable between a rest position and a controlling position upon variations of said fluid pressure in said servomotor for transmitting to the muscle of the user such variations of pressure by the movement of said controlling means between the rest position and the controlling position thereof.

References Cited in the file of this patent

UNITED STATES PATENTS

| | | |
|---|---|---|
| 2,442,530 | Eberle | June 1, 1948 |
| 2,499,018 | Christiano | Feb. 28, 1950 |

FOREIGN PATENTS

| | | |
|---|---|---|
| 828,291 | Germany | Jan. 17, 1952 |